United States Patent [19]

Uchikune

[11] Patent Number: 4,468,648

[45] Date of Patent: Aug. 28, 1984

[54] SWITCHABLE PERMANENT MAGNETIC CHUCK

[76] Inventor: Mamoru Uchikune, Nagano, Japan

[21] Appl. No.: 535,914

[22] Filed: Sep. 22, 1983

[30] Foreign Application Priority Data

Oct. 15, 1982 [JP] Japan ................................. 57-155170

[51] Int. Cl.$^3$ ............................................. H01F 7/04
[52] U.S. Cl. ..................................... 335/295; 335/285
[58] Field of Search ............... 355/285, 286, 295, 302, 355/306

[56] References Cited

U.S. PATENT DOCUMENTS 3,231,789 1/1966 Engelsted ............................ 335/295
3,818,399 6/1974 Edwards ............................. 335/295
4,379,277 4/1983 Braillon ............................. 335/295

FOREIGN PATENT DOCUMENTS 54-10057 10/1979 Japan .

Primary Examiner—George Harris
Attorney, Agent, or Firm—Graybeal & Cullon

[57] ABSTRACT

A switchable permanent magnetic chuck of the type capable of detachably hold a magnetic work piece. The chuck comprises a frame structure with its top and bottom being open, a work supporting faceplate and a bottom plate to cover the top and bottom openings, respectively, of the frame structure, a plurality of stationary permanent magnets supported on the frame structure and a plurality of movable permanent magnets supported on a shiftable plate which is movably accomodated in the frame structure, and adapted to be operable in association with the stationary permanent magnets to bring the work supporting faceplate into a magnetized or demagnetized condition. In order to reduce the height of the chuck without reducing the magnetic power, permanent magnets having a high coercive force are used as the above-mentioned stationary and movable permanent magnets. The stationary and movable permanent magnets are, respectively, arranged so that their magnetization directions are alternately inversed along the direction of the arrangement of magnetic pole face portions of the work supporting faceplate in correspondence with the pitch of the magnetic pole face portions.

3 Claims, 3 Drawing Figures

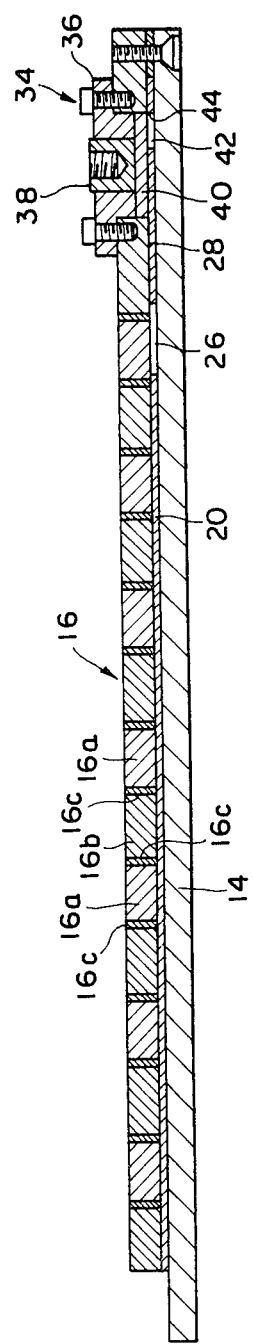
F I G. 2

SWITCHABLE PERMANENT MAGNETIC CHUCK

BACKGROUND OF THE INVENTION

1. Field of the Invention

The present invention relates to a switchable permanent magnetic chuck, and more particularly to a thin-type permanent magnetic chuck.

2. Description of the Prior Art

A typical conventional chuck of this type is disclosed, for instance, in French Patent Application No. 7118322. The permanent magnetic chuck disclosed in this French Patent Application comprises a shiftable plate which is accomodated in a frame structure and movable in the direction of the arrangement of magnetic pole face portions of a work supporting faceplate attached to the frame structure. On this shiftable plate, pole pieces made of soft iron and permanent magnets are alternately arranged with an equal pitch in the direction of its shifting movement, with the magnetization directions of the magnets being directed either upwardly or downwardly to the same direction. Likewise, on the frame structure, pole pieces made of soft iron and permanent magnets are alternately arranged, along the shiftable plate, with the same pitch as the pitch of the pole pieces and the permanent magnets of the shiftable plate, with the magnetization directions of the magnets of the frame structure being directed in the same direction as the magnetization directions of the permanent magnets of the shiftable plate.

When the movable permanent magnets of the shiftable plate are brought in transverse alignment with the stationary permanent magnets of the frame structure, the magnetic pole face portions of the work supporting faceplate will be magnetized to establish alternately inverted magnetic poles along the direction of their arrangement, whereby the work supporting plate will be brought in a magnetized condition. In this case, the movable pole pieces provided on the shiftable plate and the stationary pole pieces provided on the frame structure will establish, together with the adjacent movable permanent magnets and stationary permanent magnets, respectively, magnetic paths.

On the other hand, when the shiftable plate is moved to bring the movable permanent magnets thereof in aligment transversely with the stationary pole pieces of the frame structure, whereby the movable pole pieces of the shiftable plate will be brought in alignment transversely with the stationary permanent magnets of the frame structure, the transversely aligned pairs of the permanent magnets and pole pieces will establish magnetic paths, whereby the work supporting plate will be brought in a demagnetized condition.

As is apparent from the foregoing, the pole pieces establish, together with the respective permanent magnets, closed magnetic paths irrespective of whether the work supporting plate is in the magnetized condition or in the demagnetized condition. It is accordingly conceivable that by replacing the pole pieces by permanent magnets magnetized inversely of the magnetization directions of the afore-mentioned permanent magnets, it is possible to reduce the height of the respective permanent magnets to a half without reducing the overall magnetic power.

However, in the conventional permanent magnetic chuck, alnico magnets having a low coercive force were used as the permanent magnets, and it was impossible to replace the pole pieces by such permanent magnets. Namely, because of their low coercive force, it was necessary that the alnico magnets were assembled in the state of non-magnetized ferromagnetic material together with the pole pieces into the shiftable plate and the frame structure, and after the work supporting faceplate, etc. were further attached thereto to complete the assembly for the magnetic circuit of a chuck, an external magnetic field was applied to the ferromagnetic material to magnetize the ferromagnetic material to permanent magnets. Accordingly, if the pole pieces were to be replaced by the permanent magnets, it would be necessary to magnetize a number of such ferromagnetic pieces in alternately inversed directions along the direction of their arrangement, in the magnetization operation as mentioned above. Such a magnetization operation is practically very difficult, if not impossible.

Accordingly, in the conventional permanent magnetic chuck, the use of the pole pieces was essential and it was necessary to use permanent magnets having a relatively great height to avoid a reduction of the magnetic power, whereby it was impossible to reduce the overall height of the chuck.

SUMMARY OF THE INVENTION

Accordingly, it is an object of the present invention to provide a thin-type permanent magnetic chuck having a less height than the conventional chuck.

The present invention is based on the fact that permanent magnets having a high coercive force such as ferrite magnets or rare-earth metal magnets can be assembled into the magnetic circuit in their magnetized state as permanent magnets without substantial reduction of the magnetic power as opposed to the case of alnico magnets.

The present invention is characterized in that permanent magnets having a high coercive force are used as the stationary permanent magnets supported on the frame structure of the permanent magnetic chuck and as the movable permanent magnets supported on the shiftable plate movably mounted in the frame structure, and the stationary and the movable permanent magnets are, respectively, arranged so that their magnetization directions are alternately inversed along the respective directions of their arrangements.

Namely, the present invention provides a switchable permanent magnetic chuck comprising a frame structure made of non-magnetic material, a bottom plate to cover a bottom opening of the frame structure, a work supporting faceplate disposed to cover a top opening of the frame structure and provided with a plurality of magnetic pole face portions magnetically insulated from one another and arranged with a predetermined pitch in one direction, a shiftable plate accomodated in the frame structure in parallel with the work supporting faceplate and adapted to be movable in the direction of the arrangement of the magnetic pole face portions, a plurality of stationary permanent magnets arranged with the same pitch as the pitch of the magnetic pole face portions to face them by the sides of the shiftable plate along the direction of the movement of the shiftable plate and magnetized in the thickness direction of the shiftable plate, and a plurality of movable permanent magnets supported on the shiftable plate for integral movement therewith, arranged with the same pitch as the pitch of said stationary permanent magnets along the direction of the movement of the shiftable plate and magnetized in the thickness direction of the shiftable plate. The stationary and movable permanent magnets are made of a high coercive force magnet. Further, they are arranged so that their magnetization directions are alternately inversed along the direction of the their arrangement.

Other objects and features of the present invention will become apparent from the following detailed description of the preferred embodiment as illustrated in the accompanying drawings.

BRIEF DESCRIPTION OF THE DRAWINGS

FIG. 2 is a cross sectional view taken along line II—II of FIG. 1.

Figure 1:
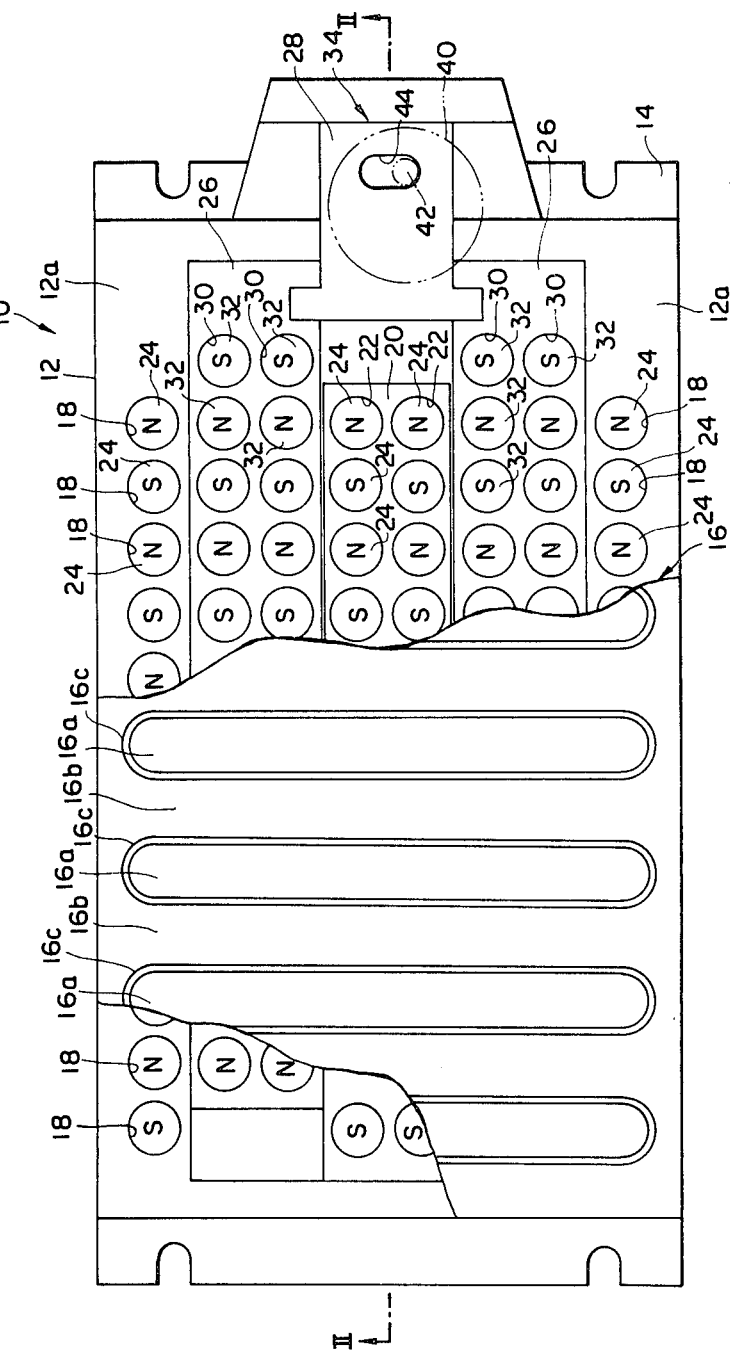
FIG. 1 is a plan view, with parts broken away, of a permanent magnetic chuck of the present invention in its magnetized condition.

Referring to the drawings, the permanent magnetic chuck 10 of the present invention comprises a generally rectangular frame structure 12 made of a non-magnetic material, a bottom plate 14 made of a magnetic material such as soft iron, disposed to cover the bottom opening of the frame structure 12 and fixed to the frame structure 12, and a work supporting faceplate 16 disposed to cover the top opening of the frame structure 12 and fixed to the frame structure 12.

As is well known, the work supporting faceplate 16 has a number of magnetic pole face portions 16a and 16b which are arranged with a predetermined pitch in the longitudinal direction, and the adjacent magnetic pole face portions 16a and 16b are magnetically insulated from each other by a non-magnetic member 16c. In the illustrated embodiment, the magnetic pole face portions 16b are continuous to one another. However, as is well known, they may be otherwise magnetically insulated by such a non-magnetic material as mentioned above.

Along the longitudinal side portions 12a of the frame structure 12, there are provided a number of holes 18 which correspond to the above-mentioned magnetic pole face portions 16a and 16b with the same pitch as the pitch of the magnetic pole face portions. The holes 18 are in alignment with one another in the longitudinal direction of the portions 12a and each hole 18 extends vertically through the respective portion 12a of the frame structure 12. Further, at the center portion of the frame structure 12, a supporting plate 20 made of a non-magnetic substance is disposed. The supporting plate 20 constitutes a part of the frame structure 12 and it is securely fixed to the frame structure and extends in the longitudinal direction of the frame structure 12 with a distance from the above-mentioned side portions 12a. On the supporting plate 20, a number of holes 22 are provided which are arranged to constitute a pair in the transverse direction of the supporting plate and to be in alignment in the longitudinal direction of the supporting plate 12. Each hole 22 extends vertically, i.e., in the direction of the supporting plate thickness, through the supporting plate 20. The respective holes 22 are transversely in alignment with the holes 18 of the side portions 12a.

In each of the holes 18 and 22, a disc-shaped permanent magnet 24 having a high coercive force, such as a ferrite magnet or a rare-earth metal magnet, is placed. Each magnet 24 is magnetized in the direction of its thickness. The permanent magnets 24 in the holes 18 are arranged so that their magnetization directions are alternately inverted along the longitudinal direction of the frame structure 12. Whereas, the permanent magnets 24 in the holes 22 are arranged so that their magnetization directions are alternately inverted along the longitudinal direction of the frame structure 12 and coincide with the magnetization directions of the permanents magnets 24 in the corresponding holes 18 in the transverse direction of the frame structure 12. The permanent magnets 24 are securely supported by the frame structure 12.

In recess formed between the supporting plate 20 and both side portions 12a along both sides of the supporting plate, shiftable plates 26 are placed in parallel with the work supporting faceplate 16, and each shiftable plate 26 is adapted to be movable in the longitudinal direction of the frame structure 12, i.e. in the direction of the arrangement of the magnetic pole face portions 16a and 16b. The shiftable plates 26 are connected at their one ends by a connecting member 28 so that they are integrally operable.

Each shiftable plate 26 is provided with two longitudinal rows of holes 30 with the same longitudinal pitch as the longitudinal pitch of the afore-mentioned magnetic pole face portions, or the longitudinal pitch of the holes 18 or 22. Each hole 30 extends vertically through the shiftable plate 26, i.e. in the thickness direction thereof, and in each hole, a disc-shaped permanent magnet 32 having a high coercive force similar to the permanent magnet 24 is placed. The permanent magnets 32 are arranged so that their magnetization directions coincide with each other in the transverse direction of the frame structure 12 and are alternately inverted along the longitudinal direction of the frame structure 12.

In connection with the afore-mentioned connecting plate 28, an operation mechanism 34 is provided to move the shiftable plates 26 for one pitch of the holes 30 in the longitudinal direction of the shiftable plate 26. For example, as shown in FIG. 2, the operation mechanism 34 comprises an operation shaft 38 rotatably supported by a bearing 36 fixed to the work supporting faceplate 16, a circular plate 40 fixed to the lower end of the operation shaft and an eccentric shaft 42 provided on the circular plate 40, said eccentric shaft being slidably fitted in a slit 44 provided on the connecting plate 28.

Figure 3:
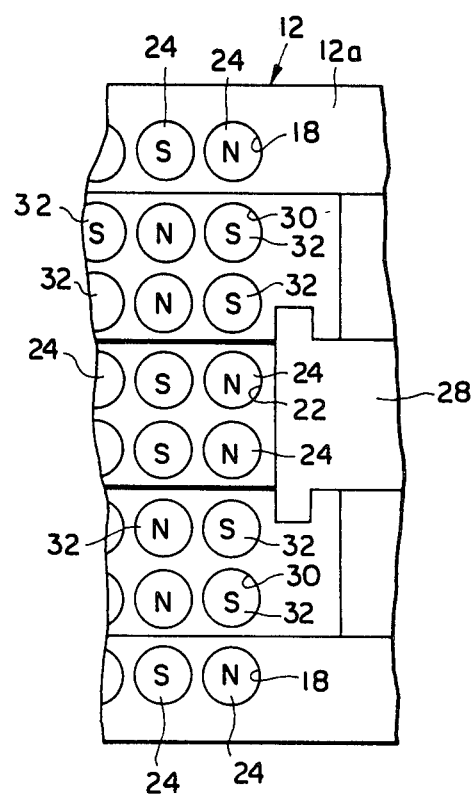
FIG. 3 is a view similar to FIG. 1 but illustrates the permanent magnetic chuck of the present invention in its demagnetized condition.

Thus, the operation shaft 38 is rotationally operable to move the shiftable plates 26 to a work holding or "on" position where the magnetization directions of the permanent magnets 24 supported on the fixed supporting plate 20 and side portions 12a and 16b of the frame structure 12 are transversely in alignment with the magnetization directions of the permanent magnets 32 of the shiftable plates 26, as shown in FIG. 2. It is likewise operable to move the shiftable plates 26 to a work release or "off" position where the magnetization directions of the permanent magnets 24 are transversely different from the magnetization directions of the permanent magnets 32 of the shiftable plates 26, as shown in FIG. 3.

In the "on" position, beneath the magnetic pole portions 16a and 16b, the permanent magnets 24 and 32 face the respective magnetic pole face portions 16a and 16b with their magnetization directions being the same along the lengthwise directions of the respective magnetic pole face portions, whereby the magnetic pole face portions 16a and 16b are magnetized to have alternately inverted magnetization directions along the direction of the arrangement thereof, i.e. along the longitudinal direction of the frame structure, and the chuck 10 is in a magnetized condition.

In the magnetized condition, if a magnetic work piece is placed on the work supporting faceplate 16, each permanent magnet 24 establishes, together with the longitudinally adjacent permanent magnets 24, a closed magnetic path extending through the corresponding magnetic pole face portion 16a or 16b and the work piece placed thereon. Likewise, each permanent magnet 32 on the shiftable plate 26 establishes, together with the longitudinally adjacent permanent magnets 32, a closed magnetic path similar to the one described above. In each closed magnetic path, the pair of the permanent magnets 24 and 24 or 32 and 32 act as the magnetizing source. Thus, in the afore-mentioned magnetized condition, a strong attractive or supporting force is obtainable.

In the "off" position, a closed magnetic path is established between transversely adjacent permanent magnets 24 and 32, whereby each magnetic pole face portion is not magnetized and the chuck 10 is in a demagnetized condition.

In the chuck 10 of the present invention, high coercive force permanent magnets are used as the permanent magnets 24 and 32. Accordingly, it is unnecessary to assemble them in a non-magnetized state into the chuck and then to magnetize them by the application of an external magnetic field, as was the case in the afore-mentioned conventional chuck, and even when assembled into the predetermined portions in the magnetized state as permanent magnets, the permanent magnets 24 and 32 made of a high coercive force magnetic material will not lose the magnetic power.

Accordingly, the permanent magnets 24 and 32 can be assembled into the predetermined portion so that their magnetization directions are alternately inversed in the direction of the arrangement thereof, as mentioned above, whereby it is unnecessary to use pole pieces as required in the conventional chuck, and inversely magnetized permanent magnets 24 and 32 can be used instead of the pole pieces.

Pairs of the adjacent permanent magnets 24 and 24 or 30 and 30 act as the magnetization sources of the respective closed magnetic paths in the afore-mentioned magnetized condition, whereby even when the thickness of the magnets 24 and 32 is made less than that of the permanent magnets in the conventional chuck, the chuck 10 of the present invention will have a magnetic attraction force substantially equal to or greater than that obtainable by the conventional chuck, and the overall height of the chuck 10 can thereby be reduced.

It is preferred to use a rare-earth metal magnet as the permanent magnets 24 and 32 since the rare-earth metal magnet has a higher magnetic flux density that a ferrite magnet.

In the foregoing, the present invention has been described with reference to a rectangular chuck. It should be understood, however, that the present invention is also applicable to a circular chuck having a circular frame structure. Further, the number of the stationary and movable permanent magnets 24 and 32 and the combinations of their arrangements may optionally be varied.

What is claimed is:

1. A switchable permanent magnetic chuck comprising a frame structure made of non-magnetic material, a bottom plate to cover a bottom opening of the frame structure, a work supporting faceplate disposed to cover a top opening of the frame structure and provided with a plurality of magnetic pole face portions magnetically insulated from one another and arranged with a predetermined pitch in one direction, a shiftable plate accomodated in the frame structure in parallel with the work supporting faceplate and adapted to be movable in the direction of the arrangement of the magnetic pole face portions, a plurality of stationary permanent magnets arranged with the same pitch as the pitch of the magnetic pole face portions to face them by the sides of the shiftable plate along the direction of the movement of the shiftable plate and magnetized in the thickness direction of the shiftable plate and a plurality of movable permanent magnets supported on the shiftable plate for integral movement therewith, arranged with the same pitch as the pitch of said stationary permanent magnets along the direction of the movement of the shiftable plate and magnetized in the thickness direction of the shiftable plate, the stationary and movable permanent magnets being made of a high coercive force magnet, and the magnetization directions of the stationary and movable permanent magnets being respectively alternately inversed along the respective directions of their arrangements.

2. The permanent magnetic chuck as claimed in claim 1 wherein the stationary and movable permanent magnets are rare-earth metal magnets.

3. The permanent magnetic chuck as claimed in claim 1 which includes an operation mechanism adapted to move the shiftable plate, the operation mechanism comprising a bearing provided on the work supporting faceplate, an operation shaft rotatably supported by the bearing, a circular plate fixed to the operation shaft, and an eccentric shaft provided on the circular plate, the eccentric shaft being operably connected to the shiftable plate.

* * * * *